(12) United States Patent
McMullen et al.

(10) Patent No.: US 8,712,438 B1
(45) Date of Patent: Apr. 29, 2014

(54) METHOD AND SYSTEM FOR ASSOCIATING A CELL-SECTOR WITH TIME-DEPENDENT LOCATION PARAMETERS

(75) Inventors: Michael P. McMullen, Leawood, KS (US); Rodney D. Nelson, Overland Park, KS (US); Benjamin Wilson, Shawnee, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 27 days.

(21) Appl. No.: 13/479,677

(22) Filed: May 24, 2012

(51) Int. Cl.
*H04M 3/42* (2006.01)
*H04W 24/00* (2009.01)
*G01S 3/02* (2006.01)

(52) U.S. Cl.
USPC .................. 455/456.2; 455/414.1; 455/456.1; 342/457

(58) Field of Classification Search
USPC ................. 455/414.1, 456.1–456.6; 701/206; 342/457
See application file for complete search history.

(56) References Cited

U.S. PATENT DOCUMENTS

| | | | |
|---|---|---|---|
| 6,243,039 B1 * | 6/2001 | Elliot | 342/457 |
| 6,433,735 B1 | 8/2002 | Bloebaum et al. | |
| 6,442,393 B1 | 8/2002 | Hogan | |
| 6,813,498 B1 * | 11/2004 | Durga et al. | 455/456.1 |
| 6,865,395 B2 | 3/2005 | Riley | |
| 7,974,642 B2 * | 7/2011 | Lin et al. | 455/456.6 |
| 8,014,793 B2 * | 9/2011 | Kansal et al. | 455/456.3 |
| 8,073,456 B2 | 12/2011 | Tidestav | |
| 8,121,621 B2 | 2/2012 | Hoshino et al. | |
| 8,380,176 B2 * | 2/2013 | Adler et al. | 455/414.1 |
| 2004/0203880 A1 * | 10/2004 | Riley | 455/456.1 |
| 2007/0143005 A1 * | 6/2007 | Chiou | 701/206 |
| 2010/0093377 A1 | 4/2010 | Riley et al. | |
| 2011/0034178 A1 | 2/2011 | Mehta | |
| 2013/0218838 A1 * | 8/2013 | Bevan et al. | 707/626 |

OTHER PUBLICATIONS

Emiliano Trevisani and Andrea Vitaletti, "Cell-ID location technique, limits and benefits: an experimental study," Proceedings of the Sixth IEEE Workshop on Mobile Computing Systems and Applications, 2004.

Jonas Willaredt, "WiFi and Cell-ID based positioning-Protocols, Standards and Solutions," Technische Universität Berlin, Jan. 26, 2011.

* cited by examiner

*Primary Examiner* — Nizar Sivji

(57) ABSTRACT

A set of location fixes is obtained for a plurality of mobile stations, wherein each mobile station is served by a serving area of a wireless network at a respective date and time of day. The set of location fixes is used to determine different geographic parameters that apply to the serving area for different time periods (e.g., different days of the week and/or times of day). A location server may receive a request to locate a mobile station that is being served by the serving area at a current date/time. The location server may select a representative location and at least one uncertainty parameter based on the geographic parameters that apply to the serving area for the time period corresponding to the current date/time, and report the representative location and at least one uncertainty parameter in response to the request.

21 Claims, 5 Drawing Sheets

METHOD AND SYSTEM FOR ASSOCIATING A CELL-SECTOR WITH TIME-DEPENDENT LOCATION PARAMETERS

BACKGROUND

Wireless devices, such as cellular telephones, are increasingly using location-based services. In a typical example, an application running on a wireless device could obtain an estimated location of the wireless device and then use that estimated location to provide some type of service to the user of the wireless device, such as showing the estimated location on a map, providing directions, or identifying nearby restaurants or other businesses.

The estimated location could be obtained using any number of location-determination techniques. In one possible approach, the wireless device may receive wireless signals from multiple satellite-based transmitters. The Global Positioning System (GPS) is an example of this approach. In another possible approach, the wireless device may receive wireless signals from multiple terrestrial-based transmitters. Advanced forward link trilateration (AFLT) is an example of this approach. In yet another possible approach, the estimated location of the wireless device may be determined based on the cell or the cell-sector that is currently serving the wireless device. For example, a centroid that was previously calculated for the cell-sector may be given as the estimated location of the wireless devices.

The estimated locations that are obtained in such approaches can have differing levels of uncertainty. Thus, an application that obtains an estimated location of a wireless device may also obtain an estimate of the uncertainty associated with the estimated location. In the case of estimated locations that are obtained using wireless signals from satellite-based transmitters or terrestrial-based transmitters, the uncertainty may depend on the characteristics of the wireless signals themselves and/or on the number of transmitters that are used. In the case of an estimated location that is obtained based on the cell-sector that is currently serving the wireless device, the uncertainty is often estimated based on calculated boundaries of the cell-sector.

Overview

In a first principal aspect, an exemplary embodiment provides a method for reporting location information. A request to locate a mobile station is received from a requestor. A serving area of a wireless network that serves the mobile station at a current date and a current time of day is determined. A representative location associated with the serving area is selected based on at least one of the current date and current time of day. At least one uncertainty parameter associated with the representative location is selected based on at least one of the current date and current time of day. The representative location and the at least one uncertainty parameter are reported to the requestor in response to the request.

In a second principal aspect, an exemplary embodiment provides a method for determining time-dependent location parameters for a serving area of a wireless network. A set of location fixes is obtained, during a collection period, for a plurality of mobile stations. Each of the location fixes is obtained for a respective mobile station that is being served by the serving area at a respective date and time of day within the collection period. A plurality of time periods is defined. The set of location fixes is divided into a plurality of time-period-subsets, such that each time period in the plurality of time periods is associated with a respective time-period-subset of the set of location fixes. For each given time period in the plurality of time periods, (i) a set of geographic parameters that cooperatively define a geographic area encompassing at least some location fixes in the given time period's respective time-period-subset is determined, and (ii) a record that associates the set of geographic parameters with the serving area and the given time period is stored in data storage.

In a third principal aspect, an exemplary embodiment provides a system. The system comprises a processor, data storage, and program instructions stored in the data storage. The program instructions are executable by the processor to cause the system to perform functions, comprising: (a) receiving a request to locate a mobile station; (b) determining a serving area of a wireless network, the serving area serving the mobile station at a current date and a current time of day; (c) selecting a representative location and at least one uncertainty parameter based on the serving area and at least one of the current date and the current time of day; and (d) reporting the representative location and the at least one uncertainty parameter in response to the request.

DETAILED DESCRIPTION OF EXEMPLARY EMBODIMENTS

1. Introduction

Figure 1:
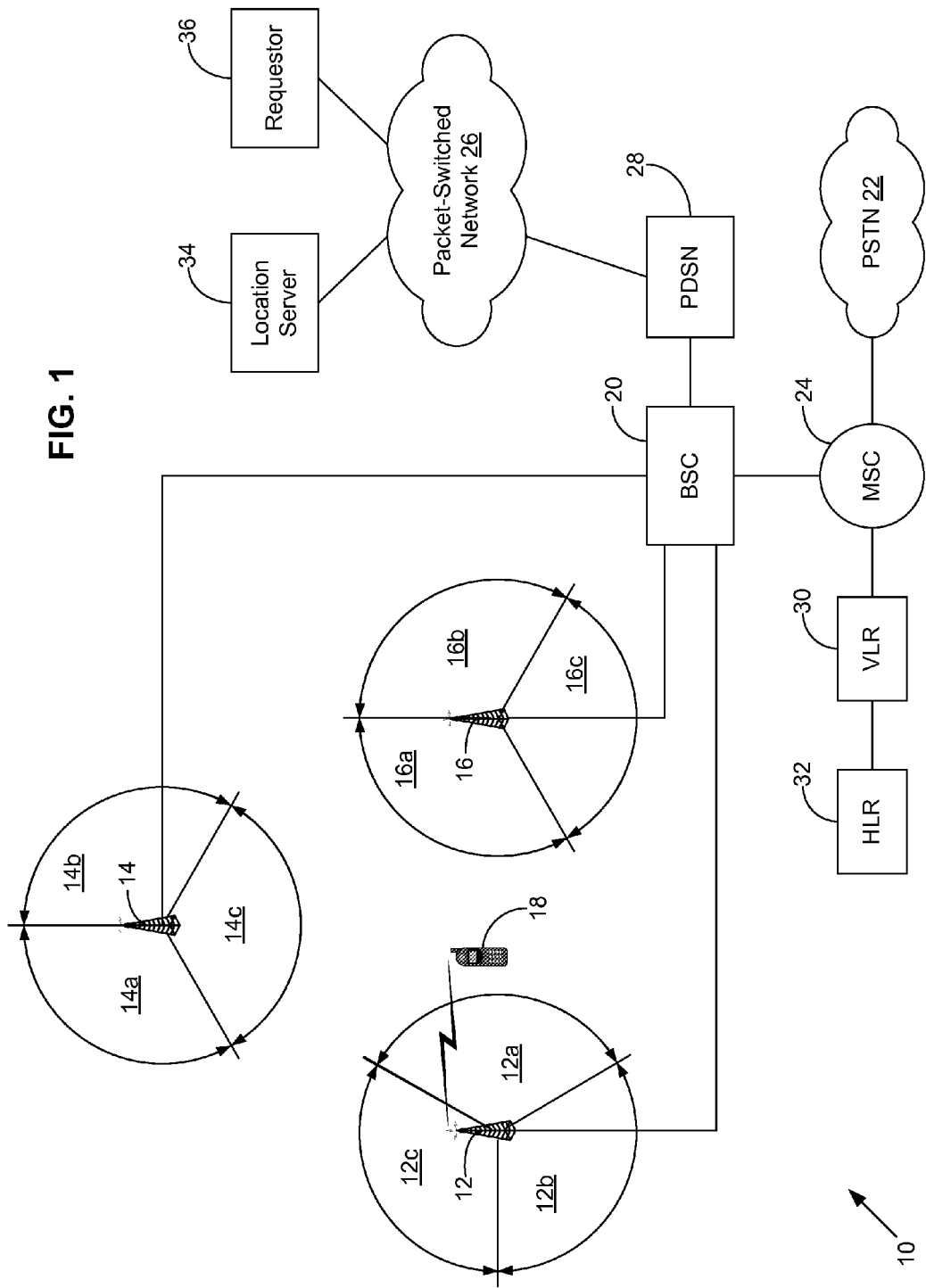
FIG. 1 is a block diagram of a wireless telecommunications network, in accordance with an exemplary embodiment.

The inventors have recognized that conventional approaches for estimating a location and uncertainty for a mobile station based on the cell or cell-sector serving the mobile station can lead to inaccurate results because of network utilization. For example, if the cell-sector that is closest to a mobile station is heavily loaded, then the mobile station may be served by a neighboring cell-sector instead. In that case, estimating the mobile station's location and location uncertainty based on the boundaries calculated for the neighboring cell-sector may be inaccurate because the mobile station may be located outside of those boundaries. To address this problem, the inventors propose taking into account time-dependent usage patterns when determining a location and uncertainty associated with the cell or cell-sector serving the mobile station being located.

Disclosed herein are methods and systems for associating a serving area of a wireless network with time-dependent location parameters. The serving area could be, for example, a cell-sector. The time-dependent location parameters could be time-dependent geographic parameters that characterize a geographic extent of the serving area during different time periods. The different time periods could be, for example, different days of the week. Thus, a serving area could have one set of geographic parameters for Mondays, another set of geographic parameters for Tuesdays, yet another set of geographic parameters for Wednesdays, etc. In other examples, a time period may include multiple days. Thus, a serving area could have one set of geographic parameters for weekdays (Monday through Friday) and another set of geographic parameters for weekends (Saturday and Sunday). In still other examples, a time period could correspond to a portion of a day. Thus, a serving area could have one set of geographic parameters for weekdays during morning rush hour (e.g., 7 a.m. through 9 a.m.), another set of geographic parameters for weekdays between rush hour periods (e.g., 9 a.m. through 4 p.m.), yet another set of geographic parameters for weekdays during afternoon rush hour (e.g., 4 p.m. through 6 p.m.), etc. Other time periods are also possible.

The geographic parameters that apply to a serving area during a given time period could characterize the geographic extent of the serving area in different ways. As one example, the serving area could be characterized as a circle, in which case the geographic parameters could include the location of the center of the circle and a distance that corresponds to the radius of the circle. As another example, the serving area could be characterized as an ellipse, in which case the geographic parameters could include the location of the center of the ellipse and distances that correspond to the major and minor radii of the ellipse. As yet another example, the serving area could be characterized as a polygon, in which case the geographic parameters could include the locations of the vertices of the polygon.

The geographic parameters for a serving area could be determined by obtaining location fixes for mobile stations that are being served by that serving area. The location fixes could be obtained by using GPS, AFLT, or other location-determination technique. If enough location fixes are obtained, then the geographic extent of the serving area could be mapped out for different time periods. For example, it may be possible to determine a geographic area (e.g., a circle, ellipse, polygon, or other shape) that encompasses all of the location fixes, or at least a predetermined fraction (e.g., 95%) of the location fixes, that correspond to a given time period. A set of geographic parameters that cooperatively define that geographic area (e.g., a center and radius, in the case of a circle) may then be associated with the serving area for that given time period. In this way, a serving area may be associated with a plurality of different time periods and each time period may be associated with a respective set of geographic parameters.

These time-dependent geographic parameters may then be used to provide location information in response to a request to locate a mobile station. For example, a location server may receive a request to locate a mobile station from a requestor. The requestor could be an application running on the mobile station or an external application. In response, the location server may determine that the mobile station is being served by a particular serving area at a current date and a current time of day. The location server may then select a representative location and one or more uncertainty parameters based on the current date and/or current time of day and report the representative location and the one or more uncertainty parameters to the requestor in response to the request.

To select the representative location and the one or more uncertainty parameters based on the current date and/or current time of day, the location server may (i) determine which time period that has been defined for the serving area corresponds to the current date and/or current time, (ii) look up the geographic parameters associated with that time period, and (iii) determine the representative location and the one or more uncertainty parameters based on the geographic parameters associated with that time period. For example, if the geographic parameters include a center and radius for a circle, the location server could select the center as the representative location and could select the radius as an uncertainty parameter. If the geographic parameters include a center and major and minor radii of an ellipse, then the location server could select the center as the representative location and could select the major and minor radii as uncertainty parameters. If the geographic parameters define a polygon, then the location server could determine a representative location that defines the location of the polygon and could determine one or more uncertainty parameters that define one or more dimensions of the polygon. Alternatively, the location server could determine a center and radius of a circle (or a center and radii of an ellipse) that approximates the polygon and then select the center as the representative location and the radius or radii as the one or more uncertainty parameters.

In this way, the location information that is provided for a mobile station based on its serving area can, at least partially, take into account time-dependent usage patterns that can change the effective size of the serving area.

2. Exemplary Wireless Telecommunications Network

FIG. 1 is a block diagram of a wireless telecommunications network 10 in which exemplary embodiments may be employed. Wireless telecommunications network 10 includes a plurality base transceiver stations (BTSs), exemplified in FIG. 1 by BTS 12, BTS 14, and BTS 16, that can wirelessly communicate with mobile stations, such as mobile station 18. Mobile station 18 could be, for example, a wireless telephone, a wirelessly-equipped computer (such as a handheld, laptop, or tablet computer), or other wireless communication device.

Each BTS could provide wireless coverage in an area, such as a cell, or in multiple wireless coverage areas, such as cell-sectors. As shown in FIG. 1, the wireless coverage provided by each of BTSs 12, 14, and 16 is directionally divided into three cell-sectors. Thus, BTS 12 provides cell-sectors 12a, 12b, and 12c, BTS 14 provides cell-sectors 14a, 14b, and 14c, and BTS 16 provides cell-sectors 16a, 16b, and 16c. The geographic extent of a given cell-sector can depend on a number of factors, such as the configuration of the antennas at the BTS, the transmission power levels, the terrain (including the locations building or other obstructions), the locations of neighboring cell-sections, and the relative utilization levels of the neighboring cell-sectors as compared to the given cell-sector. Some of these factors, such as relative utilization levels, can be time dependent. For instance, at certain times of the day, mobile station 18 could be served by cell-sector 12a when located as shown in FIG. 1. However, at other times of the day, while at that same location, mobile station 18 might be served by cell-sector 14c or by cell-sector 16a, for example, because cell-sector 12a is more heavily loaded. Of course, the cell-sector serving mobile station 18 can also change as a result of mobile station 18 moving. For example, if mobile station 18 is served by cell-sector 12a as shown in FIG. 1 but then moves to a different location, mobile station 18 could then be served by cell-sector 14c (e.g., if it moves closer to BTS 14) or by cell-sector 16a (e.g., if it moves closer to BTS 16).

When mobile station 18 is being served by a given cell-sector, mobile station 18 may be able to transmit and receive wireless communications in accordance with a wireless communications protocol, for example, such as 1 xRTT CDMA, EVDO, GSM, WiMAX (IEEE 802.16), WiFi (IEEE 802.11), UMTS, or LTE. This wireless communication could involve mobile station 18 exchanging voice, text, video, data, or other media, with one or more endpoints. In this regard, BTSs 12, 14, and 16 may be controlled by a base station controller (BSC) 20, which in turn may support communications with endpoints via one or more networks. In the example shown in FIG. 1, BSC 20 is communicatively coupled to a public switched telephone network (PSTN) 22 via a mobile switching center (MSC) 24 and to a packet-switched network 26 via a packet data serving node (PDSN) 28. It is to be understood, however, that this arrangement is exemplary only. For example, BSC 20 might support communications with PSTN 22 but not with packet network 26, might support communications with packet network 26 but PSTN 22, or might support communications with one or more other types of networks.

Mobile station 18 may communicate with other mobile stations and/or with landline stations via MSC 24 and PSTN 22. In this regard, MSC 24 may serve a plurality of BTSs (including BTSs 12, 14, and 16) via BSC 20 and may also serve another plurality of BTSs via one or more other BSCs. Wireless telecommunications network 10 may also include one or more additional MSCs that serve other BTSs in other areas.

To keep track of where mobile stations, such as mobile station 18 are operating, wireless telecommunications network 10 may include a visitor location register (VLR) 30 and a home location register (HLR) 32, as shown in FIG. 1. VLR 30 may keep track of mobile stations that are currently being served by MSC 24, and HLR 32 may keep track of all mobile stations that subscribe to wireless telecommunications network 10. VLR 30 and HLR 32 may obtain information regarding the locations of mobile stations through registration messages that the mobile stations transmit at various times. For example, a mobile station might transmit a registration message that identifies its current cell-sector when the mobile station first powers-up, at regular time intervals thereafter (e.g., every 10 minutes), and in response to other triggers (such as moving a certain distance or moving into a different paging zone). These registration messages could be received by VLR 30 and HLR 32. In this way, VLR 30 and HLR 32 may maintain location for each mobile station in its service area (which could be, for VLR 30, the area served by MSC 24 and, for HLR 32, all areas served by wireless telecommunications network 10). The location information for a mobile station could include an identification of the cell-sector that the mobile station reported in its most recent registration message and the date/time of the most recent registration message. HLR 32 and/or VLR 30 could also maintain other types of location information for mobile stations.

Packet-switched network 26 may include one or more private packet data networks and/or one or more public packet data networks (such as the Internet). Mobile stations, such as mobile station 18, may communicate with endpoints, such as other mobile stations, landline stations, email servers, Web servers, gaming server, and media servers, via packet-switched network 26. Some of those communications could involve location-based services, in which a mobile station or an external application may obtain or provide information based on the mobile station's location. In such cases, the mobile station's location could be provided by a location server 34, which could be connected packet-switched network 26. In particular, location server 34 may receive a request to locate a mobile station, such as mobile station 18, and may provide an estimated location of the mobile station (e.g., in terms of latitude and longitude) in response to the request. Location server 34 may also provide an uncertainty associated with the estimated location.

The request to locate the mobile station could originate from the mobile station itself, or the request could originate from an external application, exemplified in FIG. 1 by requestor 36. In some cases, the location of the mobile station could be determined using the cell-sector that is currently-serving the mobile station. For example, if the mobile station originates a request to determine its location, the mobile station may include in the request an identification of the cell-sector that is currently serving it. If requestor 36 originates the request to locate the mobile station, then location server 34 could determine the cell-sector currently serving the mobile station (according to the mobile station's last registration message) by querying VLR 30 or HLR 32.

Figure 2:
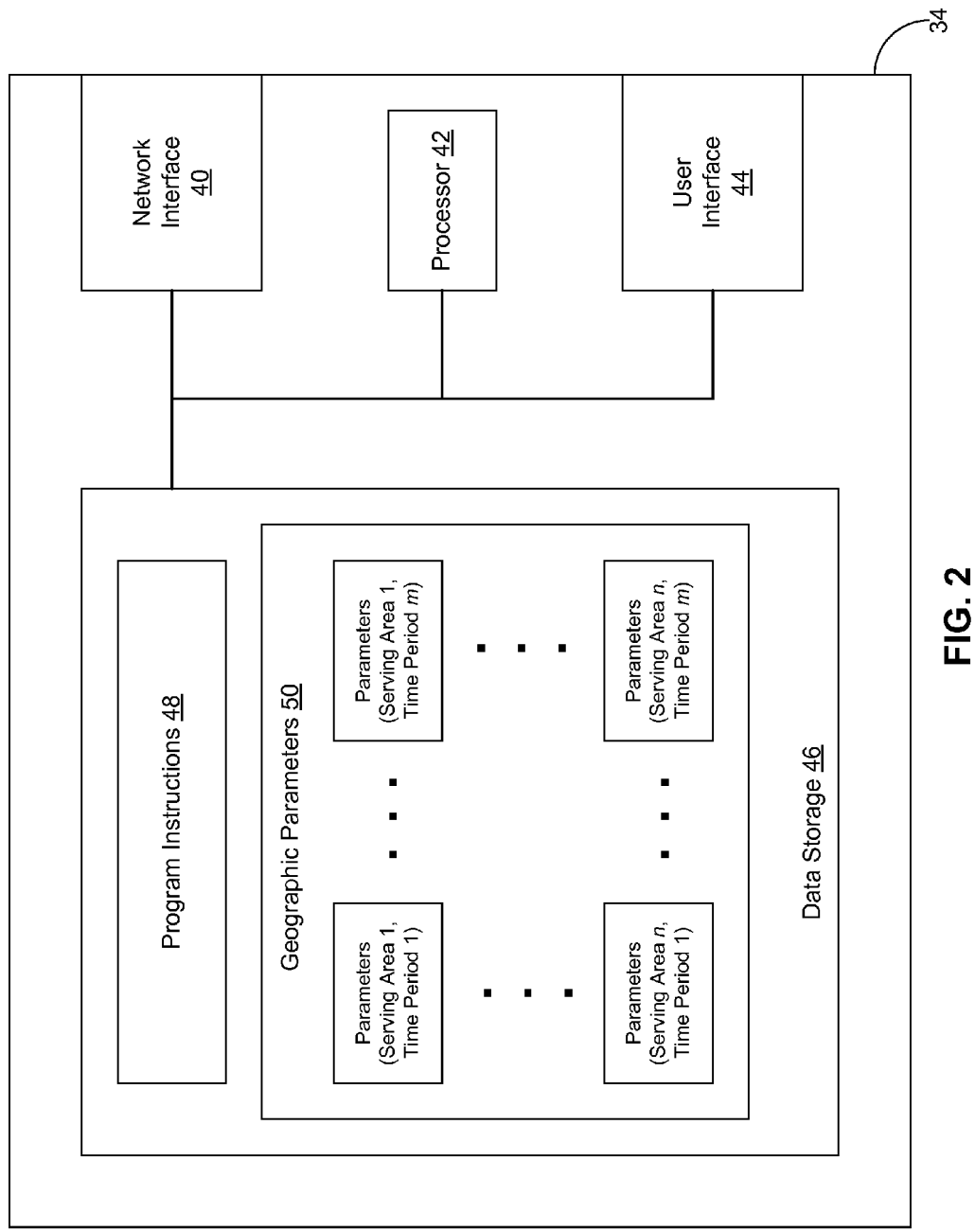
FIG. 2 is a block diagram of a location server, in accordance with an exemplary embodiment.

Once location server 34 has determined the cell-sector currently serving the mobile station, location server 34 may determine a representative location and uncertainty based on geographic parameters that apply to that cell-sector for the current date/time. In this regard, FIG. 2 illustrates an exemplary configuration for location server 34. As shown in FIG. 2, location server 34 may include a network interface 40 through which location server 34 can receive requests to locate mobile stations and provide responses. For example, location server 34 could be communicatively coupled to packet-switched network 26 via network interface 40. Location server 34 may also be able to query VLR 30 and/or HLR 32 via network interface 40.

As shown in FIG. 2, location server 34 also includes a processor 42, a user interface 44, and data storage 46. User interface 44 could include one or more displays and/or other output devices for outputting text, graphics, or other information to a user. User interface 44 could also include one or more input devices, such as a keyboard, for receiving input from a user. Such input could be used, for example, to control the functioning of location server 34.

Data storage 46 may include read only memory (ROM), random access memory (RAM), flash memory, one or more magnetically-encoded disks, one or more optically-encoded disks, or any other type of non-transitory computer readable medium. Data storage 46 may store, for example, program instructions 48 and geographic parameters 50. Geographic parameters 50 can include parameters that apply to a given serving area for each of m time periods. In addition, geographic parameters 50 can include parameters that apply to n serving areas. With reference to FIG. 1, the n serving areas could include, for example, cell-sectors 12a, 12b, 12c, 14a, 14b, 14c, 16a, 16b, and 16c.

Each set of parameters for a given serving area and given time period may characterize a geographic extent of that given serving area during that given time period and may be used to determine a representative location and uncertainty for a mobile station that is being served by that given serving area during that given time period. For example, if the geographic extent of a given serving area is characterized as a circle, then the geographic parameters for that given sector could include the latitude and longitude coordinates of the center of the circle (representative location) and a distance corresponding to the radius of the circle (uncertainty), with different centers and radii being applicable for different time periods. Alternatively or additionally, geographic parameters 50 could include parameters that characterize each serving area as an ellipse, polygon, or some other shape.

Program instructions 48 may include instructions that can be executed by processor 42 to cause location server 34 to perform any of the functions described herein. Thus, program instructions 48 may be executable by processor 42 to determine geographic parameters 50 (e.g., as described below for FIG. 3) and/or to provide a representative location and uncertainty based on geographic parameters 50 in response to a request to locate a mobile station (e.g., as described below for FIG. 5).

Although FIG. 2 illustrates an example in which geographic parameters 50 are stored in location server 34, it is to be understood that some or all of geographic parameters 50 could be stored in other network elements that are accessible by location server 34. In addition, while location server 34 has been described above as being connected to packet-switched network 26, it is to be understood that location server 34 could be otherwise located in wireless telecommunications network 10.

3. Exemplary Methods

Figure 3:
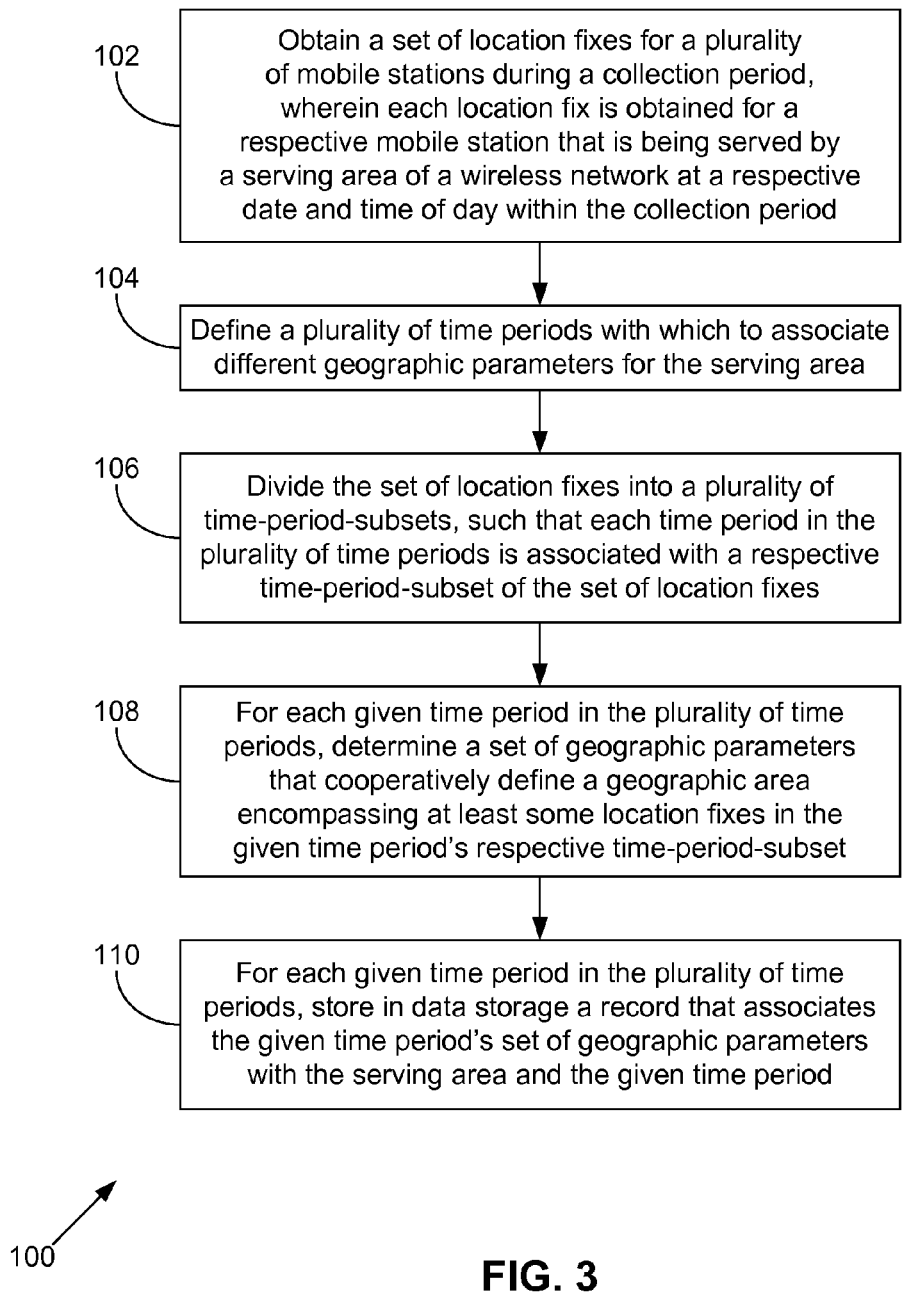
FIG. 3 is a flowchart of a method in which time-dependent geographic parameters are determined for a serving area, in accordance with an exemplary embodiment.

FIG. 3 is a flowchart illustrating an exemplary method 100 for determining time-dependent geographic parameters for a serving area, such as may be included in geographic parameters 50 shown in FIG. 2. For purposes of illustration, method 100 is described with reference to the configuration of wireless telecommunications network 10 shown in FIG. 1 and the configuration of location server 34 shown in FIG. 2. It is to be understood, however, that other configurations and/or elements could be used.

Method 100 may begin with obtaining a set of location fixes for a plurality of mobile stations during a collection period, wherein each location fix is obtained for a respective mobile station that is being served by a serving area of a wireless network at a respective date and time of day within the collection period, as indicated by block 102. The serving area could be any wireless coverage area in the wireless network, such as a cell or a cell-sector. For example, the serving area could be cell-sector 12a shown in FIG. 1, in which case the location fixes could be obtained for any mobile station (or any mobile station for which a permission to locate has been obtained) that is served by cell-sector 12a at any time during the collection period.

The collection period could be any period of time that covers different usage patterns experienced by the serving area. For example, to include different usage patterns that can occur during different days of the week, the collection period could include an entire week, or could include multiple weeks. In other cases, the collection period could cover a greater period of time, for example, to include different usage patterns that may occur during times of the year. In still other cases, the collection period might only sample certain times of certain days of the week (i.e., the collection period may be a series of discontinuous periods of time). Other collection periods could also be used.

The location fixes could be obtained using any type of location-determination technique that can determine a mobile station's location within the serving area. Thus, some or all of the location fixes could be obtained using wireless signals from satellite-based transmitters (e.g., using GPS). As well, some or all of the location fixes could be obtained using wireless signals using terrestrial-based transmitters (e.g., using AFLT). For example, with mobile station 18 located as shown in FIG. 1, wireless signals from BTSs 12, 14, and 16 may be used to obtain a location fix. Other ways of obtaining location fixes could also be used.

Method 100 also involves defining a plurality of time periods with which to associate different geographic parameters for the serving area, as indicated by block 104. The plurality of time periods could, for example, correspond to different days of the week and/or different portions of different days of the week. In the example of FIG. 2, geographic parameters 50 include, for each serving area, a respective set of parameters for each of m time periods. Thus, in the case that the time periods correspond to different days of the week, m=7. However, m could be less than 7 if larger time periods are defined. For example, the plurality of time periods could be just two time periods: one time period for weekdays (Monday through Friday) and one time period for weekends (Saturday and Sunday). Alternatively, m could be greater than 7, for example, if each time period corresponds to a particular portion (such as an hourly portion) of a particular day of the week. Other time periods could also be defined.

Method 100 further involves dividing the set of location fixes into a plurality of time-period subsets, such that each time period in the plurality of time periods is associated with a respective time-period-subset of the set of location fixes, as indicated by block 106. Thus, if m time periods are defined, then the set of location fixes could be divided into m subsets, with each location fix being assigned to one of subsets based on when the location fix was obtained. For example, if the time periods correspond to the days of the week, then the location fixes that were obtained on any Monday during the collection period would be assigned to the Monday subset, the location fixes that were obtained on any Tuesday during the collection period would be assigned to the Tuesday subset, etc.

Method 100 may then involve, for each given time period in the plurality of time periods, determining a set of geographic parameters that cooperatively define a geographic area encompassing at least some of the location fixes in the given time period's respective time-period-subset, as indicated by block 108. The geographic area that is defined in this way could be a polygon that that encloses some or all of the other location fixes, for example as illustrated in FIGS. 4A and 4B.

Figure 4A:
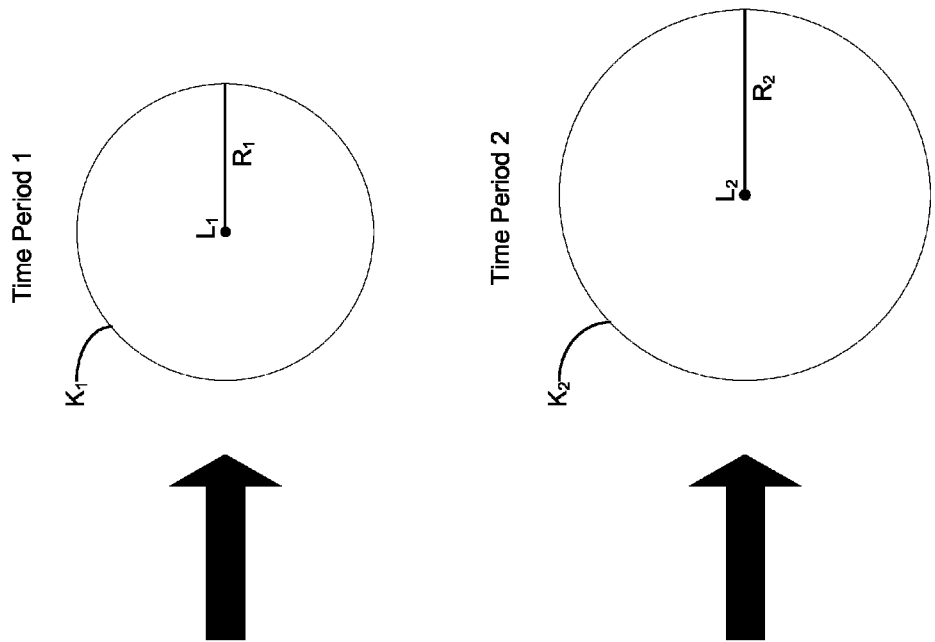
FIG. 4A is a conceptual illustration of a process for determining a representative location and uncertainty value that apply to a cell-sector during a first time period, in accordance with an exemplary embodiment.
Figure 4A:
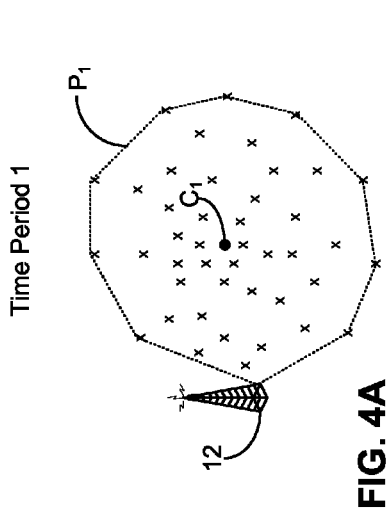
Figure 4B:
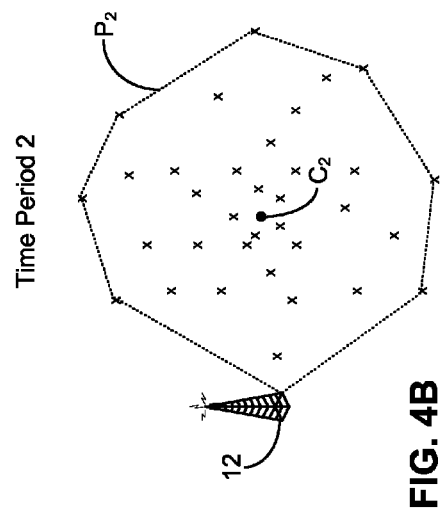
FIG. 4B is a conceptual illustration of a process for determining a representative location and uncertainty value that apply to the cell sector of FIG. 4A during a second time period, in accordance with an exemplary embodiment.

In FIGS. 4A and 4B, the serving area is cell-sector 12a provided by BTS 12. FIG. 4A indicates by X's the location fixes that were obtained during portions of the collection period that correspond to "Time Period 1." These location fixes could be statistically analyzed to determine a centroid location, indicated by $C_1$. For example, the centroid location $C_1$ could correspond to an average location or most-likely location based on the location fixes shown in FIG. 4A. A set of exterior location fixes could then be identified as the location fixes that are the most distant from centroid location $C_1$ in different directions. The exterior location fixes could be used to define a polygon, $P_1$, that encloses all or at least a predetermined portion of the "Time Period 1" location fixes. As shown in FIG. 4A, the exterior location fixes are vertices of polygon $P_1$, such that all of the location fixes are enclosed by polygon $P_1$ (the location of BTS 12 is also one of the vertices of polygon $P_1$ in this example). In other cases, however, one or more "outlier" location fixes might fall outside of the polygon. Thus, the polygon could be chosen so as to enclose a predetermined portion of the location fixes, such as 90% or 95% of the location fixes.

FIG. 4B illustrates a similar process, but for a different time period, identified as "Time Period 2." Figure indicates by X's the location fixes that were obtained during portions of the collection period that correspond to "Time Period 2." A centroid location, $C_2$, may be determined based on the "Time Period 2" location fixes (e.g., as described above for FIG.

4A), and exterior location fixes may be identified as the location fixes that are the most distant from centroid location $C_2$ in different directions. The exterior location fixes could be used to define a polygon, $P_2$, that encloses all or at least a predetermined portion of the "Time Period 2" location fixes. As shown in FIG. 4B, the exterior location fixes are vertices of polygon $P_2$, such that all of the location fixes are enclosed by polygon $P_2$ (the location of BTS 12 is also one of the vertices of polygon $P_2$ in this example). In other cases, however, one or more "outlier" location fixes might fall outside of the polygon. Thus, the polygon could be chosen so as to enclose a predetermined portion of the location fixes, such as 90% or 95% of the location fixes.

Although the same procedures may be used in the examples of FIGS. 4A and 4B to determine centroid locations and polygons, the centroid locations and polygons that are determined in these two examples may be different because of different usage patterns in "Time Period 1" and "Time Period 2." As shown, polygon $P_2$ is generally larger than polygon $P_1$, and the distance between centroid location $C_2$ and BTS 12 is greater than the distance between centroid location $C_1$ and BTS 12. Thus, cell-sector 12a has a larger effective size in "Time Period 2" than in "Time Period 1."

It is also to be understood that shapes other than polygons could be used to define geographic areas that encompass some or all of the location fixes for a given serving area and time period. For example, polygon $P_1$ could be approximated as a circle, $K_1$, having a center location, $L_1$, and a radius, $R_1$. Similarly, polygon $P_2$ could be approximated as a circle, $K_2$, having a center location $L_2$, and a radius, $R_2$. The circles could be determined based on the polygons on various ways. For example, to define circle $K_1$, center location $L_1$ could be taken as centroid location $C_1$, and radius $R_1$ could be taken as the distance from centroid location $C_1$ to the most distant point on polygon $P_1$. Alternatively, circle $K_1$ could be defined as the smallest circle that encompasses polygon $P_1$ (in which case center location $L_1$ might not correspond to centroid location $C_1$). Other ways of defining circles based on polygons could be used.

Alternatively or additionally, the polygons could be approximated as other shapes. For example, a polygon could be approximated as an ellipse having a center location, a major radius and a minor radius. Further, it is to be understood that shapes, such as circles and ellipses, could be determined directly from the location fixes, instead of being approximated from polygons that are determined from the location fixes.

Turning back to FIG. 3, method 100 could further involve for each given time period in the plurality of time periods, storing in data storage a record that associates the given time period's set of geographic parameters with the serving area and the given time period, as indicated by block 110. With reference to FIG. 2, the records that are stored in data storage in this way could, for example, correspond to geographic parameters 50 that are stored in data storage 46 for a particular serving area. Thus, the method illustrated in FIG. 3 could be repeated for multiple serving areas, resulting in stored parameters for n serving areas and m time periods, as shown in FIG. 2.

The geographic parameters that make up the stored record for a given serving area and time period could include some or all of the geographic parameters that are determined in block 108 of method 100. Thus, with reference to FIG. 4A, the record for cell-sector 12a and "Time Period 1" could include the centroid location $C_1$ and parameters that define polygon $P_1$, such as its dimensions or the locations of its vertices. Alternatively or additionally, the record could include geographic parameters that defined one or more other shapes, such as center location $L_1$ and radius $R_1$ that define circle $K_1$. Similarly, with reference to FIG. 4B, the record for cell-sector 12a and "Time Period 2" could include the centroid location $C_2$ and parameters that define polygon $P_2$, such as its dimensions or the locations of its vertices. Alternatively or additionally, the record could include geographic parameters that defined one or more other shapes, such as center location $L_2$ and radius $R_2$ that define circle $K_2$.

Figure 5:
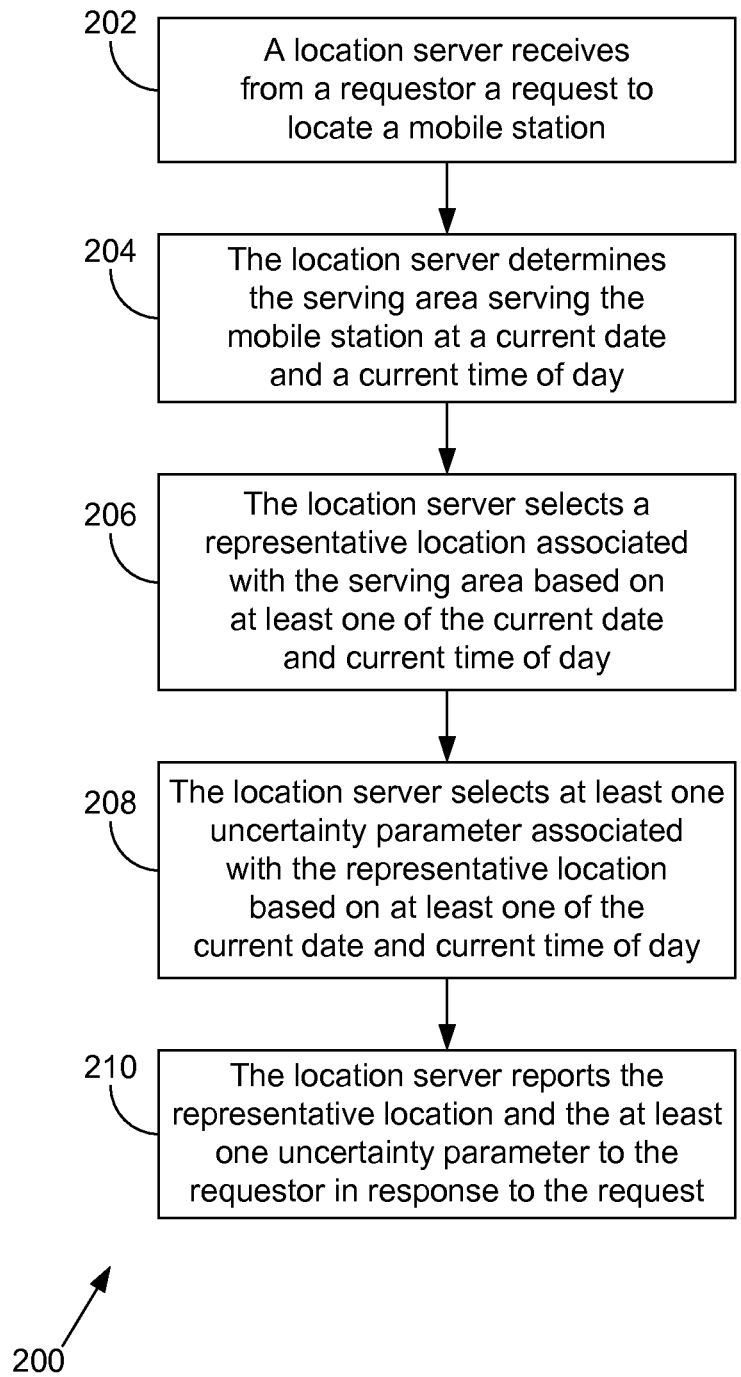
FIG. 5 is a flowchart of a method for providing location information to a requestor, in accordance with an exemplary embodiment.

The records of time-dependent geographic parameters that are determined for one or more serving area (e.g., as described above for FIG. 3) may then be used to provide location information in response to a request to locate a mobile station. FIG. 5 illustrates an example method 200 for providing such location information. Method 200 is described with reference to the configuration of wireless telecommunications network 10 shown in FIG. 1 and the configuration of location server 34 shown in FIG. 2. It is to be understood, however, that other configurations and/or elements could be used.

Method 200 begins when a location server (e.g., location server 34) receives from a requestor a request to locate a mobile station (e.g., mobile station 18), as indicated by block 202. The requestor could correspond to an application that is running on the mobile station. For example, a user of mobile station 18 may invoke a mapping application or other application that provides information based on location. In response, mobile station 18 may query location server 34 to request its location. Alternatively, the requestor could correspond to an application that is external to the mobile station. For example, a user of mobile station 18 may access a Web site or other external application that is configured to provide content or information that is based on location. In response, the external application (e.g., requestor 36) may query location server 34 to request the location of mobile station 18.

In response to the request, the location server may determine the serving area serving the mobile station at a current date and a current time of day, as indicated by block 204. The serving area could be a cell-sector or other type of wireless coverage area. The current date and current time of day may correspond to the date/time that the location server received the request. To determine the serving area serving the mobile station at the current date and current time of day, the location server may refer to information that is contained in the request that it received from the requestor in block 202. For example, the request could identify the serving area that is currently serving the mobile station. Alternatively, the location server could determine the serving area by querying a network element such as HLR 32 or VLR 30. For example, HLR 32 and/or VLR 30 may store an identification of the serving area serving the mobile station based on the mobile station's most recent registration message, or could page the mobile station to have the mobile station identify its current serving area. Other ways of determining the serving area serving the mobile station at the current date and time of day are also possible.

The location server may then select a representative location associated with the serving area based on at least one of the current date and current time of day, as indicated by block 206. For example, the location server may access data storage that stores records of geographic parameters for the serving area for each of m time periods (e.g., as shown in FIG. 2) and select from the geographic parameters for the time period that corresponds to the current date and/or current time of day. For example, if the m time periods correspond to different days of the week and the current date is a Monday, then the location server may select from the geographic parameters for Monday. If the m time periods correspond to different time ranges (e.g., hourly ranges) within different days of the week, then the location server may select from the geographic parameters for the day of the week that corresponds to the current date and the time range that corresponds to the current time of day.

In selecting from the geographic parameters that are associated with the relevant time period, the location server may select a predefined location in the geographic parameters as the representative location. For example, the geographic parameters might include a centroid location (e.g., centroid location $C_1$), a center of a circle (e.g., center location $L_1$), and/or a center of an ellipse, and the location server might select one of these predefined locations as the representative location. Alternatively, the geographic parameters might include parameters that define a representative polygon for the serving area (e.g., polygon $P_1$). In that case, the location server could determine a representative location based on the representative polygon. For example, the representative location could define the location of the representative polygon, or the representative location could correspond to a center of a circle or a center of an ellipse that is derived from the representative polygon. Other ways of selecting a representative location for the serving area based on at least one of the current date and current time of day are also possible.

The location server may also select at least one uncertainty parameter associated with the representative location based on at least one of the current date and current time of day, as indicated by block 208. The at least one uncertainty parameter could be included in the geographic parameters (e.g., as a predefined uncertainty parameter) that the location server selected for the representative location. For example, if the representative location defined a center of a circle, then the at least one uncertainty parameter could define a radius of the circle. If the representative location defined a center of an ellipse, then the at least one uncertainty parameter could define a major radius and minor radius of the ellipse. If the representative location defined a location of a polygon, then the at least one uncertainty parameter could define at least one dimension of the polygon. Alternatively, the at least one uncertainty parameter could be derived from the geographic parameters. For example, if the location server derives a circle from a representative polygon (e.g., polygon $P_1$) to determine the representative location, then the radius of the circle could be an uncertainty parameter. If the location server derives an ellipse from a representative polygon to determine the representative location, then the major radius and minor radius of the ellipse could be uncertainty parameters. Other ways of selecting at least one uncertainty parameter associated with the representative location based on at least one of the current date and current time of day are also possible.

Once the representative location and at least one uncertainty parameter have been selected, the location server may report the representative location and at least one uncertainty parameter to the requestor in response to the request, as indicated by block 210. The requestor may then use the representative location and at least one uncertainty parameter to provide information to a user of the mobile station. For example, if a mapping application on the mobile station is the requestor, then the mapping application may display the representative location on a map as the location of the mobile station. In addition, the mapping application may indicate an uncertainty in the mobile station's location based on the at least one uncertainty parameter. For example, the mapping application may show a circle, ellipse, or other shape around the mobile station's indicated location on the map. The dimensions of the circle, ellipse, or other shape used to indicate the uncertainty may be based on the at least one uncertainty parameter provided by the location server.

In this way, the location information that is provided to a requestor that requests the location of a mobile station may more accurately reflect the mobile station's location and uncertainty in the mobile station's location.

4. Conclusion

Exemplary embodiments of the present invention have been described above. Those skilled in the art will understand, however, that changes and modifications may be made to these embodiments without departing from the true scope and spirit of the invention, which is defined by the claims.

What is claimed is:
1. A method, comprising:
receiving from a requestor a request to locate a mobile station;
in response to said request, determining that a serving area provided by a base transceiver station of a wireless network is serving said mobile station at a current date and a current time of day;
in response to determining that said serving area is serving said mobile station at said current date and said current time of day, accessing data storage that stores geographic parameters associated with said serving area, wherein said stored geographic parameters associated with said serving area include respective geographic parameters for each of a plurality of time periods;
selecting a representative location associated with said serving area based on said stored geographic parameters associated with said serving area and at least one of said current date and said current time of day;
selecting at least one uncertainty parameter associated with said representative location based on said stored geographic parameters associated with said serving area and at least one of said current date and said current time of day; and
reporting said representative location and said at least one uncertainty parameter to said requestor.
2. The method of claim 1, wherein said serving area is a cell-sector.
3. The method of claim 1, wherein said representative location defines a center of a circle and said at least one uncertainty parameter defines a radius of said circle.
4. The method of claim 1, wherein said representative location defines a center of an ellipse and said at least one uncertainty parameter defines a major radius and a minor radius of said ellipse.
5. The method of claim 1, wherein said representative location defines a location of a polygon and said at least one uncertainty parameter defines at least one dimension of said polygon.
6. The method of claim 1, wherein said stored geographic parameters associated with said serving area comprise a set of predefined locations associated with said serving area, wherein each of said predefined locations is associated with a respective time period; and
wherein selecting a representative location associated with said serving area based on said geographic parameters associated with said serving area and at least one of said current date and said current time of day comprises selecting the predefined location in the set of predefined locations that is associated with a time period that corresponds to at least one of said current date and said current time of day.

7. The method of claim 6, wherein each of said predefined locations is associated with a particular day of the week.

8. The method of claim 7, wherein each predefined location that is associated with a weekday is further associated with a particular range of times within that weekday.

9. The method of claim 1, wherein said stored geographic parameters associated with said serving area comprise a set of predefined uncertainty parameters associated with said serving area, wherein each of said predefined uncertainty parameters is associated with a respective time period; and
wherein selecting at least one uncertainty parameter comprises selecting the predefined uncertainty parameter in the set of predefined uncertainty parameters that is associated with a time period that corresponds to at least one of said current date and said current time of day.

10. The method of claim 9, wherein each of said predefined uncertainty parameters is associated with a particular day of the week.

11. The method of claim 10, wherein each predefined uncertainty parameter that is associated with a weekday is further associated with a particular range of times within that weekday.

12. The method of claim 1, wherein said stored geographic parameters associated with said serving area comprise a set of predefined polygons associated with said serving area, wherein each of said predefined polygons is associated with a respective time period;
wherein selecting a representative location associated with said serving area based on said stored geographic parameters associated with said serving area and at least one of said current date and said current time of day comprises:
selecting as a representative polygon a predefined polygon in the set of predefined polygons that is associated with a time period that corresponds to at least one of said current date and said current time of day; and
determining said representative location based on said representative polygon.

13. The method of claim 12, wherein selecting at least one uncertainty parameter associated with said representative location based on at least one of said stored geographic parameters and at least one of said current date and said current time of day comprises determining said at least one uncertainty parameter based on said representative polygon.

14. A method, comprising:
obtaining, for a serving area provided by a base transceiver station of a wireless network, during a collection period, a set of location fixes for a plurality of mobile stations, wherein each of said location fixes is obtained for a respective mobile station being served by said serving area at a respective date and time of day within said collection period, wherein said mobile stations are configured to wirelessly communicate with said wireless network;
defining a plurality of time periods;
dividing said set of location fixes into a plurality of time-period-subsets, such that each time period in said plurality of time periods is associated with a respective time-period-subset of said set of location fixes; and
for each given time period in said plurality of time periods, (i) determining a set of geographic parameters that cooperatively define a geographic area encompassing at least some location fixes in said given time period's respective time-period-subset, and (ii) storing, in data storage, a record that associates said set of geographic parameters with said serving area and said given time period.

15. The method of claim 14, wherein at least some location fixes in said set of location fixes are obtained using wireless signals from satellite-based transmitters.

16. The method of claim 14, wherein at least some location fixes in said set of location fixes are obtained using wireless signals from terrestrial-based transmitters.

17. The method of claim 14, wherein each of said time periods in said plurality of time periods corresponds to one or more time intervals within said collection period, and wherein dividing said set of location fixes into a plurality of time-period-subsets comprises assigning each respective location fix to one of said time-period-subsets based on when said respective location fix was obtained.

18. The method of claim 14, wherein determining a set of geographic parameters that cooperatively define a geographic area encompassing at least some location fixes in said given time period's respective time-period-subset comprises determining at least one of: (a) a representative location that defines a center of a circle and an uncertainty parameter defines a radius of said circle; (b) a representative location that defines a center of an ellipse and uncertainty parameters that define a major radius and a minor radius of said ellipse; and (c) a representative location that defines a location of a polygon and at least one uncertainty parameter that defines at least one dimension of said polygon.

19. A system, comprising:
a processor;
data storage; and
program instructions stored in said data storage, wherein said program instructions are executable by said processor to cause said system to perform functions, said functions comprising:
receiving a request to locate a mobile station;
in response to said request, determining that a serving area provided by a base transceiver station of a wireless network is serving said mobile station at a current date and a current time of day;
in response to determining that said serving area is serving said mobile station at said current date and said current time of day, accessing data storage that stores geographic parameters associated with said serving area, wherein said stored geographic parameters associated with said serving area include respective geographic parameters for each of a plurality of time periods;
selecting, from said stored geographic parameters, geographic parameters for a time period in said plurality of time periods corresponding to at least one of said current date and said current time of day;
selecting a representative location and at least one uncertainty parameter based on said selected geographic parameters; and
reporting said representative location and said at least one uncertainty parameter.

20. The system of claim 19, wherein said functions further comprise:
determining said set of geometric parameters associated with said serving area based on a set of location fixes obtained for mobile stations served by said serving area during a collecting period.

21. The system of claim 19, wherein said records of geographic parameters associated with said serving area comprise a set of predefined locations and a set of predefined uncertainty parameters associated with said serving area, wherein each of said predefined locations and said predefined uncertainty parameters is associated with a respective time period.

* * * * *